United States Patent
Sato et al.

(10) Patent No.: US 7,993,591 B2
(45) Date of Patent: Aug. 9, 2011

(54) SPOUTED BED DEVICE AND POLYOLEFIN PRODUCTION PROCESS USING THE SAME

(75) Inventors: Hideki Sato, Ichihara (JP); Hiroyuki Ogawa, Ichihara (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 399 days.

(21) Appl. No.: 12/332,102

(22) Filed: Dec. 10, 2008

(65) Prior Publication Data
US 2009/0149620 A1 Jun. 11, 2009

(30) Foreign Application Priority Data

Dec. 11, 2007 (JP) ................ P2007-320168

(51) Int. Cl.
*B01J 8/18* (2006.01)
*B01J 10/00* (2006.01)
*C08F 2/00* (2006.01)
*C08F 210/00* (2006.01)

(52) U.S. Cl. ........ 422/129; 422/139; 422/140; 422/141; 422/142; 526/65; 526/348

(58) Field of Classification Search .............. 526/348, 526/65; 422/129, 139, 140, 141, 142
See application file for complete search history.

(56) References Cited

U.S. PATENT DOCUMENTS

| | | | |
|---|---|---|---|
| 2,477,454 A | 7/1949 | Heath | |
| 2,867,506 A | 1/1959 | Roberts | |
| 2,890,106 A | 6/1959 | Heath | |
| 2,936,303 A | 5/1960 | Goins | |
| 3,079,222 A | 2/1963 | Reeve | |
| 3,242,586 A | 3/1966 | Peterson | |
| 3,242,588 A | 3/1966 | Peterson | |
| 3,262,922 A | 7/1966 | Payne | |
| 3,495,952 A | 2/1970 | Ulbrecht | |
| 3,644,583 A | 2/1972 | Scoggin et al. | |
| 3,652,527 A | 3/1972 | Trieschmann et al. | |
| 3,719,029 A | 3/1973 | Suzukawa et al. | |

(Continued)

FOREIGN PATENT DOCUMENTS

CA 739660 8/1966

(Continued)

OTHER PUBLICATIONS

Search Report issued Nov. 10, 2010, in Singapore Patent Application No. 201004966-6.

(Continued)

*Primary Examiner* — William K Cheung
(74) *Attorney, Agent, or Firm* — Birch, Stewart, Kolasch & Birch, LLP (57) ABSTRACT

A spouted bed device of the present invention includes a cylinder which extends vertically; a closing plate which closes a top end of the cylinder; a decreasing diameter member which is formed at a bottom end of the cylinder, has an inside diameter that decreases progressively downward, and has a gas inlet orifice at a bottom end thereof; and a gas discharge nozzle which passes through the cylinder from an inside surface to an outside surface thereof and which discharges gas from a treatment zone enclosed by a top surface of the decreasing diameter member, a bottom surface of the closing plate and the inside surface of the cylinder. The gas discharge nozzle is provided above a spouted bed which is formed within treatment zone.

8 Claims, 3 Drawing Sheets

U.S. PATENT DOCUMENTS

| | | | |
|---|---|---|---|
| 3,770,714 A | 11/1973 | Dorschner et al. | |
| 3,776,979 A | 12/1973 | Hill | |
| 3,957,448 A | 5/1976 | Shepard et al. | |
| 3,971,768 A | 7/1976 | Peters et al. | |
| 4,129,701 A | 12/1978 | Jezl et al. | |
| 4,337,722 A | 7/1982 | Debayeux et al. | |
| 4,373,272 A | 2/1983 | Jones et al. | |
| 4,404,083 A | 9/1983 | Vasalos | |
| 4,419,330 A | 12/1983 | Ishihara et al. | |
| 4,441,822 A | 4/1984 | Biswas et al. | |
| 4,457,896 A | 7/1984 | Kono | |
| 4,466,082 A | 8/1984 | Zoschak et al. | |
| 4,518,750 A | 5/1985 | Govoni et al. | |
| 4,533,367 A * | 8/1985 | Hadzismajlovic | 95/211 |
| 4,533,387 A | 8/1985 | Hadzismajlovic | |
| 4,640,339 A | 2/1987 | Klaren | |
| 4,744,413 A | 5/1988 | Klaren et al. | |
| 5,034,195 A | 7/1991 | Platz | |
| 5,213,768 A | 5/1993 | Maurel et al. | |
| 5,235,009 A | 8/1993 | Hogan | |
| 5,245,093 A | 9/1993 | Ember | |
| 5,536,378 A | 7/1996 | Gibson et al. | |
| 5,674,308 A | 10/1997 | Meissner et al. | |
| 5,676,201 A | 10/1997 | Klaren | |
| 6,066,701 A | 5/2000 | Koveal et al. | |
| 6,306,981 B1 | 10/2001 | Brown et al. | |
| 6,441,108 B1 | 8/2002 | Haendeler et al. | |
| 6,444,763 B1 | 9/2002 | Sagae et al. | |
| 6,518,372 B1 | 2/2003 | Weickert | |
| 6,689,845 B1 | 2/2004 | Govoni et al. | |
| 7,601,303 B1 | 10/2009 | Karer et al. | |
| 2006/0058474 A1 | 3/2006 | Covezzi et al. | |
| 2006/0063896 A1 | 3/2006 | McElvain et al. | |
| 2007/0217966 A1 | 9/2007 | Heino et al. | |
| 2009/0149610 A1* | 6/2009 | Sato et al. | 526/65 |
| 2010/0069581 A1* | 3/2010 | Ogawa et al. | 526/64 |
| 2010/0311923 A1* | 12/2010 | Sato et al. | 526/65 |

FOREIGN PATENT DOCUMENTS

| | | | |
|---|---|---|---|
| EP | 0088638 A2 | 9/1983 | |
| EP | 0241847 A2 | 10/1987 | |
| EP | 0381384 A1 | 8/1990 | |
| EP | 1484343 A1 | 12/2004 | |
| GB | 645656 A | 8/1960 | |
| GB | 845655 A | 8/1960 | |
| GB | 954078 A | 4/1964 | |
| GB | 1147273 A | 4/1969 | |
| GB | 1233106 A | 5/1971 | |
| GB | 1 351 624 A | 5/1974 | |
| GB | 1351624 A | 5/1974 | |
| GB | 1 587 891 A | 4/1981 | |
| GB | 1587891 A | 4/1981 | |
| GB | 2 077 628 A | 12/1981 | |
| GB | 2077628 A | 12/1981 | |
| JP | 4112916 | 7/1966 | |
| JP | 4611670 | 3/1971 | |
| JP | 4631969 | 9/1971 | |
| JP | 4742379 | 10/1972 | |
| JP | 58201802 A | 11/1983 | |
| JP | 58-216735 A | 12/1983 | |
| JP | 5921321 | 5/1984 | |
| JP | 59126406 A | 7/1984 | |
| JP | 59-42039 A | 9/1984 | |
| JP | 2233708 A | 9/1990 | |
| JP | 2676919 B2 | 7/1997 | |
| JP | 2000-302807 A | 10/2000 | |
| JP | 2002-515516 A | 6/2002 | |
| JP | 2002-520426 A | 7/2002 | |
| JP | 2002-537420 A | 11/2002 | |
| JP | 3352059 B2 | 12/2002 | |
| JP | 2003-277412 A | 10/2003 | |
| JP | 2006-502263 A | 1/2006 | |
| WO | WO 93/24533 A1 | 12/1993 | |
| WO | WO 99/59712 A1 | 11/1999 | |
| WO | WO 02/40547 A1 | 5/2002 | |
| WO | WO 2007/071527 A1 | 6/2007 | |
| WO | WO-2007/715527 A1 | 6/2007 | |

OTHER PUBLICATIONS

"Terminology Dictionary of Powder Technology, 2nd Edition", Editor Society of Power Technology, Nikkan Kogyo Shimbun-sha, 2000, p. 321.

Australian Search Report dated Apr. 22, 2009 for Application No. SG 200809160-5.

Mathur et al., "Spouted Beds", Academic Press, 1974, pp. 114-116 and 279-280.

Perry et al., "Solids-Drying Equipment", Perry's Chemical Engineers' Handbook, McGraw-Hill, 1997, pp. 12-75 and 12-76.

Singapore Search Report dated May 4, 2009 for Application No. 200809161-3.

Singapore Search Report dated May 4, 2009 for Application No. 200809157-1.

Singapore Search Report dated May 4, 2009 for Application No. 200809158-9.

Singapore Search Report dated May 4, 2009 for Application No. 200809159-7.

U.S. Office Action dated Jun. 15, 2010 for related U.S. Appl. No. 12/332,055.

Office Action issued Nov. 12, 2010, in copending U.S. Appl. No. 12/332,112.

Office Action issued Dec. 7, 2010, in U.S. Appl. No. 12/332,065.

Takeda et al., "Spouted Bed Device Provided With Gas Outlet in Sidewall." Kagaku Kogaku Ronbunshu 1, Kagaku Kogaku Kyokai, No. 2, 1975, pp. 149-154.

Hattori et al., "Minimum Spoutable Gas Flow Rate in Side-Outlet Spouted Bed With Inner Draft-Tube," Journal of Chemical Engineering of Japan, vol. 14, No. 6, Apr. 3, 1981, pp. 462-466.

Notice of Allowance issued Mar. 18, 2011, in copending U.S. Appl. No. 12/332,112.

Office Action issued Mar. 11, 2011, in copending U.S. Appl. No. 12/331,730.

Office Action in U.S. Appl. No. 12/332,112 mailed Jun. 3, 2010.

Search Report from Singapore Application No. 2008709161-3 dated Jun. 4, 2009.

Search Report from Singapore Application No. 200809159-7 dated Jun. 4, 2009.

Search Report from Singapore Application No. 200809158-9 dated Jun. 4, 2009.

Search Report from Singapore Application No. 200809157-1 dated Jun. 4, 2009.

Hatate et al., "Flow Characteristics of Draft Tube Spouted Bed and its Application", Journal of the Society of Powder Technology, vol. 34, No. 5, May 1997, pp. 343-360.

Ishikura et al., "Hydrodynamics of a Spouted Bed with a Porous Draft Tube", Kagaku Kougaku Ronbunshu, vol. 22, No. 3, 1996, pp. 615-621.

Ishikura et al., "Hydrodynamics of Modified Spouted Beds for Binary Mixtures of Particles—Effect of the Aeration Gas Flow Rate from Side Distributor", Fukuoka University Journal of Engineering, No. 58, Mar. 1997, pp. 155-165.

Ishikura, "Regime Map of Binary Particle Mixture in a Spout-Fluid Bed," Kagaku Kougaku Ronbunshu, vol. 19, No. 6, 1993, pp. 1189-1192.

Notice of Allowance dated Apr. 21, 2011 for U.S. Appl. No. 12/331,730.

Search Report dated Apr. 22, 2009 for Singapore Application No. 200809160-5.

Takenaka et al., "Fluidity characteristics of a spouted bed with a cylinder to cone-shaped perforated draft tubes," SCEJ 71st Annual Meeting, J123, 2006, 1 page.

Weickert et al., "New Reactor Concepts for the Gas-Phase Polymerization of Olefins," Chemie Ingenieur Technik, vol. 77, No. 8, 2005, pp. 977-978.

Yokokawa, "Fluidizing characteristics of fluidized bed, and spouted bed, and their application", Journal of the Society of Powder Technology, vol. 21, No. 11, Nov. 1984, pp. 715-723.

Office Action issued May 26, 2011, in copending U.S. Appl. No. 12/332,112.

Office Action issued May 6, 2011, in copending U.S. Appl. No. 12/332,065.

* cited by examiner

SPOUTED BED DEVICE AND POLYOLEFIN PRODUCTION PROCESS USING THE SAME

BACKGROUND OF THE INVENTION

1. Field of the Invention

The present invention relqates to a bed device, and to a process for producing polyolefins such as polyethylene and polypropylene using such a device.

2. Related Background Art

Spouted bed devices which employ a spouted bed have the advantage that all the particles, even relatively large particles several millimeters in size that require an excessively high gas velocity for fluidization in a fluidized bed, circulate and are thoroughly mixed. As used herein, "spouted bed" refers to a state characterized by the circulatory movement of particles wherein, under the action of a gas introduced at a high velocity from a gas inlet orifice provided at the bottom end of a cylindrical vessel, there forms a spout (sometimes referred to below as the "spout portion") which has a dilute particle concentration near the center axis of the particle bed held within the vessel and in which particles flow upward together with the gas, and there also forms at the periphery of the spout an annular particle bed where particles fall in a moving bed state under the influence of gravity.

It is known that there remains room for improvement in spouted bed devices from the standpoint of the solid-gas contact efficiency between the particles and the gas. One means for enhancing the solid-gas contacting efficiency between the particles and the gas while maintaining the excellent mixing properties of a spouted bed, described by K. Takeda and H. Hattori in "Spouted bed device provided with gas outlet in sidewall" (*Kagaku Kogaku Ronbunshu* 1, No. 2, 149-154 (Kagaku Kogaku Kyokai, 1975), involves providing a gas outlet in the sidewall of the cylindrical vessel in which the spouted bed is formed.

SUMMARY OF THE INVENTION

However, because the gas outlet in the spouted bed device described by K. Takeda et al. was formed in the sidewall of a region where the annular particle bed portion of the spouted bed is formed, many particles ended up being discharged from this discharge outlet together with the gas. Hence, there arose a need to install an auxiliary apparatus of substantial size such as a filtration unit to prevent the discharge of particles or a recovery unit for recovering discharged particles.

It is therefore an object of the present invention to provide a spouted bed device which has a simple construction yet is able to substantially improve the solid-gas contacting efficiency in the annular particle bed portion of a spouted bed. Another object of the invention is to provide a polyolefin production process which uses such a spouted bed device.

The spouted bed device according to a first aspect of the invention includes a cylinder which extends vertically; a closing plate which closes a top end of the cylinder; a decreasing diameter member which is formed at a bottom end of the cylinder, has an inside diameter that decreases progressively downward, and has a gas inlet orifice at a bottom end thereof; and a gas discharge nozzle which passes through the cylinder from an inside surface to an outside surface thereof and which discharges gas from a treatment zone enclosed by a top surface of the decreasing diameter member, a bottom surface of the closing plate and the inside surface of the cylinder. The gas discharge nozzle is provided above a spouted bed that is formed within the treatment zone.

In the spouted bed device of the present invention, a gas is made to flow inward and upward at a high velocity from the gas inlet orifice at the bottom end of the decreasing diameter member and into a treatment zone where particles are held, thereby forming a spouted bed within the treatment zone. As noted above, the spouted bed is composed of a spout portion and an annular particle bed. Some of the gas that is blown in from the gas inlet orifice forms the spout and sweeps pass the particle bed, and the remainder of the gas diffuses into the annular particle bed. By solid-gas contacting the particles and the gas in this way, it is possible in the spouted bed device to subject the particles to drying treatment or to induce a desired reaction.

In the spouted bed device of the present invention, the gas that has flowed inward and upward from the gas inlet orifice, instead of being discharged directly from the top of the reaction zone, is discharged laterally from a gas discharge nozzle formed in the cylinder, thereby increasing the amount of gas which diffuses through the annular particle bed portion of the spouted bed. As a result, in the annular particle bed portion of the spouted bed, the solid-gas contacting efficiency between the particles and the olefin-containing gas improves. In addition, this gas discharge nozzle is provided in a particle-lean zone above the spouted bed. In this way, compared with a case in which the gas discharge nozzle is provided in the sidewall in a region where the annular particle bed portion of the spouted bed is formed, the amount of particles that are discharged with the gas from the gas discharge nozzle can be reduced to such a degree that a filtration unit or recovery unit, if installed, may be of a small size. An additional advantage is that the pressure loss can be made sufficiently low.

The inventive spouted bed device may further include a deflector which is disposed above the gas inlet orifice in the treatment zone, has an outside diameter that increases progressively downward, is closed at a top end thereof, and has a bottom end which is spaced apart from an inside wall of the cylinder. It is preferable in this case for the gas discharge nozzle to be provided above the bottom end of the deflector. By positioning a deflector in this way, particles which have been blown upward by the gas can be kept from scattering. Moreover, because the gas discharge nozzle is located above the bottom end of this deflector, the amount of particles discharged from the gas discharge nozzle together with the gas can be reduced even further.

In a conventional fluidized bed device, a constant freeboard zone must be secured in order to suppress particle scatter. However, in the spouted bed device of the present invention, disposing a deflector in the above-described manner enables the scattering of particles to be suppressed. As a result, the freeboard zone can be shortened, making it possible to achieve a higher volume efficiency than in a fluidized bed device.

Generally, when compared with a fluidized bed, a spouted bed is known to be capable of exhibiting an excellent performance in terms of pressure loss and, owing to circulatory movement of the particles, to give rise to mixing which somewhat approximates plug flow. Therefore, an advantage of the spouted bed device of the present invention is that it can make the residence time distribution of particles in the treatment zone narrower than in a fluidized bed device. This is effective in cases where, for example, a polymerization reaction is carried out on polyolefin particles in the treatment zone.

In a second aspect of the invention, the spouted bed device is a multistage device in which a plurality of spouted beds are formed in the vertical direction. The multistage-type spouted bed device of the invention includes a cylinder which extends vertically; a plurality of closing plates which partition an interior of the cylinder into a plurality of spaces; a decreasing diameter member which is formed within each space, has an inside diameter that decreases progressively downward, and has a gas inlet orifice at a bottom end thereof; a gas feeding nozzle which passes through the cylinder from an outside surface to an inside surface thereof and which feeds a gas to, in each space, a bottom zone located between the decreasing diameter member and the closing plate therebelow; and a gas discharge nozzle which passes through the cylinder from the inside surface to the outside surface and which discharges a gas from, in each space, a treatment region located between the decreasing diameter member and the closing plate thereabove. The gas discharge nozzle is provided above a spouted bed that is formed within each treatment zone.

In the multistage-type spouted bed device according to this aspect of the invention, as in the single-stage spouted bed device according to the first aspect of the invention, gases are discharged laterally, thereby making it possible to achieve, in the annular particle bed portion of each spouted bed, a sufficiently high solid-gas contacting efficiency between the particles and the gas. Because each gas discharge nozzle is provided above a spouted bed, the amount of particles that are discharged from the gas discharge nozzles together with the gases can be reduced. Moreover, the pressure loss can be made sufficiently small.

In the multistage-type spouted bed device according to this aspect of the invention, a plurality of treatment zones are formed in the vertical direction, making it possible to achieve a space-saving effect in installation. Also, as noted above, because a spouted bed, unlike a fluidized bed, gives rise to mixing that somewhat approximates plug flow, the retention time distribution can be narrowed to a similar degree with fewer stages than when a plurality of fluidized beds are used.

To prevent particle scatter and enhance volume efficiency, the multistage-type spouted bed device according to this aspect of the invention, like the single-stage spouted bed device according to the first aspect of the invention, may further include a plurality of deflectors which are disposed above the gas inlet orifice in each treatment zone, have an outside diameter that increases progressively downward, are closed at a top end thereof, and have a bottom end which is spaced apart from an inside wall of the cylinder. In such a case, it is preferable for each gas discharge nozzle to be provided above the bottom end of each deflector and below the closing plate directly thereabove.

In the multistage-type spouted bed device of the invention, it is preferable to provide means for transferring particles from an upper treatment zone to a lower treatment zone. For example, an ejector or a downcomer may be employed as this transferring means.

The polyolefin production process of the present invention entails carrying out olefin polymerization by using either of the inventive spouted bed devices described above to form a spouted bed of polyolefin particles within the treatment zone. In particular, when the above-described multistage-type spouted bed device is used, it is preferable to carry out olefin polymerization by feeding to at least one treatment zone a second type of gas that differs from a first type of gas fed to the other treatment zones. By employing such a method, it is possible, for example, to efficiently produce multistage-polymerized propylene-based copolymers which have crystalline propylene-based polymer segments and amorphous propylene-based polymer segment, are called "high-impact polypropylene" (in Japan, also customarily called "polypropylene block copolymers").

In cases where, as noted above, the gas fed to a lower treatment zone differs from the gas fed to an upper treatment zone, it is preferable for the foregoing polyolefin production process to include the step of solid-gas contacting polyolefin particles removed from a treatment zone to which the first type of gas is fed with a gas similar to the second type of gas that is different from the first type of gas, before introducing the polyolefin particles to a treatment zone where the second type of gas is fed. It is possible in this way to keep the gas used in the upper treatment zone from being entrained by the polyolefin particles and entering into the lower treatment zone, thus enabling polyolefin particles having the desired performance to be more easily obtained.

The present invention thus provides spouted bed devices which have a simple construction, yet are capable of substantially improving the solid-gas contacting efficiency in the annular particle bed portion of a spouted bed, and also provides polyolefin production processes which employ such spouted bed devices.

DESCRIPTION OF THE PREFERRED EMBODIMENTS

Preferred embodiments of the invention are described in detail below while referring to the attached diagrams where necessary. Unless noted otherwise, positional relationships such as up-down and left-right are based on the relative positions shown in the diagrams. Relative dimensions of features shown in the diagrams may not be true to scale.

First Embodiment

Polyolefin Production System

Figure 1:
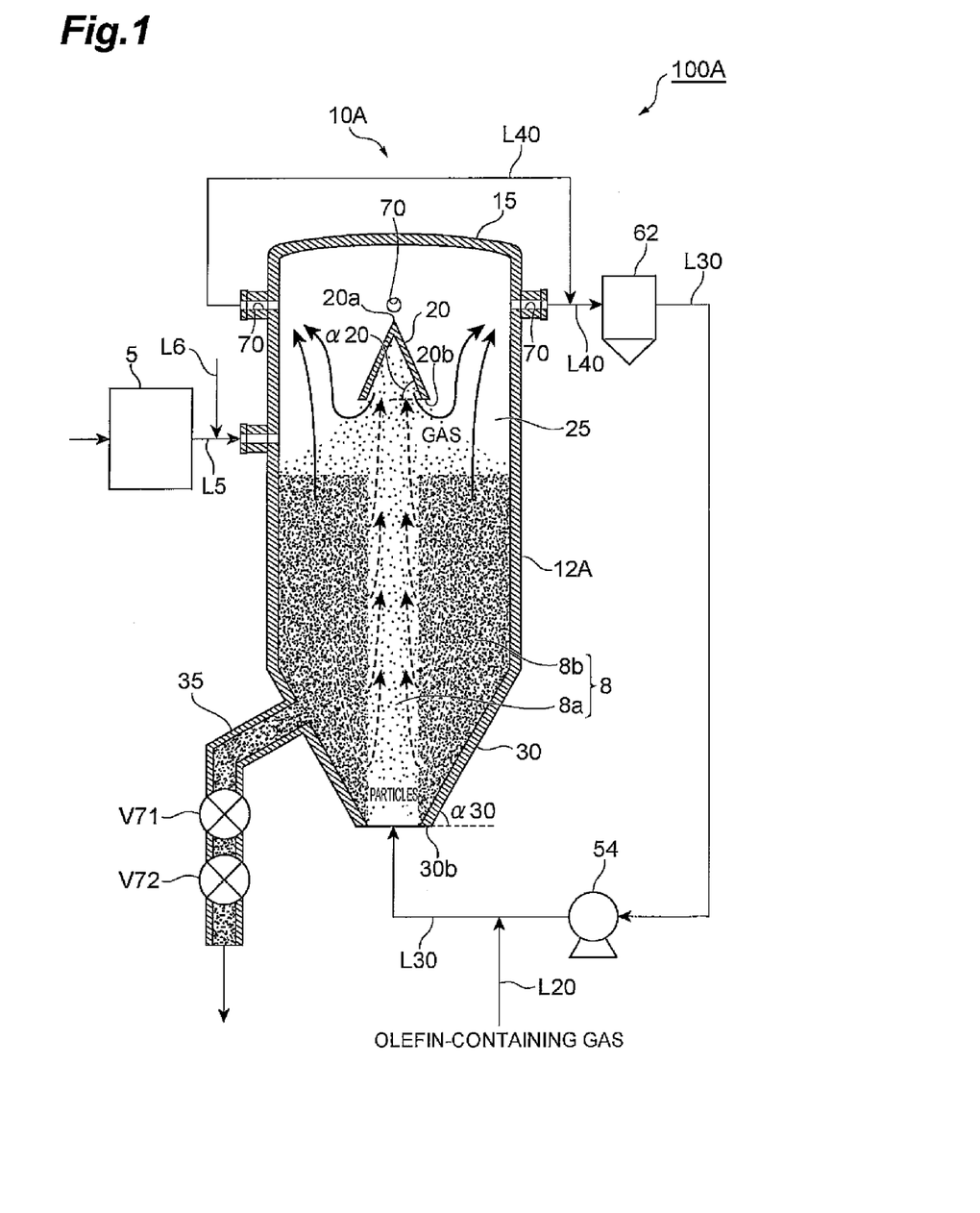
FIG. 1 is a schematic view of a first embodiment of the spouted bed device according to the present invention.

FIG. 1 shows a polyolefin production system 100A according to the first embodiment of the invention. This production system 100A includes an olefin prepolymerization reactor 5 and an olefin polymerization reactor 10A which is connected as a subsequent stage to the olefin prepolymerization reactor 5.

Olefin Prepolymerization Reactor

The olefin prepolymerization reactor 5 polymerizes olefin in the presence of an olefin polymerization catalyst to form polyolefin particles.

Examples of the olefin prepolymerization reactor 5 include, but are not limited to, slurry polymerization reactors, bulk polymerization reactors, stirred tank-type gas phase polymerization reactors, and fluidized bed-type gas phase polymerization reactors. Any one of these reactors may be used alone, a plurality of reactors of the same type may be used in combination, or two or more reactors of differing types may be used in combination.

Slurry polymerization reactors that may be used include known polymerization reactors, such as the stirred tank-type reactors and loop-type reactors described in Japanese Patent Publication No. S41-12916, Japanese Patent Publication No. S46-11670 and Japanese Patent Publication No. S47-42379. Slurry polymerization is a process in which a polymerization solvent is prepared by adding an olefin monomer such as propylene or butene to an inert solvent such as an aliphatic hydrocarbon (e.g., propane, butane, isobutane, pentane, hexane, heptane, octane) or an alicyclic hydrocarbon (e.g., cyclopentane, cyclohexane), an olefin polymerization catalyst is dispersed in the polymerization solvent to form a slurry, and polymerization is carried out in a state where the polymer that is formed does not dissolve in the polymerization solvent. Polymerization is carried out at a temperature and pressure at which the polymerization solvent is maintained in a liquid state and the polymer that is formed does not dissolve in the polymerization solvent. The polymerization temperature is generally from 30 to 100° C., and preferably from 50 to 80° C. The polymerization pressure is generally from standard pressure to 10 MPaG, and preferably from 0.3 to 5 MPaG.

Bulk polymerization reactors that may be used include known polymerization reactors, such as the stirred tank-type reactors and loop-type reactors described in Japanese Patent Publication No. S41-12916, Japanese Patent Publication No. S46-11670 and Japanese Patent Publication No. S47-42379. Bulk polymerization is a process in which an olefin monomer such as propylene or butene is used as the polymerization solvent in the substantial absence of inert solvents such as aliphatic hydrocarbons (e.g., propane, butane, isobutane, pentane, hexane, heptane, octane) and alicyclic hydrocarbons (e.g., cyclopentane, cyclohexane), an olefin polymerization catalyst is dispersed in the polymerization solvent, and polymerization is carried out in a state where the polymer that is formed does not dissolve in the polymerization solvent. Polymerization is carried out at a temperature and pressure at which the polymerization solvent is maintained in a liquid state and the polymer that is formed does not dissolve in the polymerization solvent. The polymerization temperature is generally from 30 to 100° C., and preferably from 50 to 80° C. The polymerization pressure is generally from standard pressure to 10 MPaG, and preferably from 0.5 to 5 MPaG.

Stirred tank-type gas phase polymerization reactors that may be used include known polymerization reactors, such as the reactors described in Japanese Patent Application Laid-open No. S46-31696 and Japanese Patent Publication No. S59-21321. Stirred tank-type gas phase polymerization is a process in which a monomer in a gaseous state is used as the medium and, while maintaining an olefin polymerization catalyst and olefin polymer in a fluidized state within the medium by means of an agitator, the monomer in the gaseous state is polymerized. The polymerization temperature is generally from 50 to 110° C., and preferably from 60 to 100° C. The polymerization pressure should be in a range at which the olefin can be present as a vapor phase within the stirred tank-type gas phase polymerization reactor, and is generally from standard pressure to 5 MPaG, and preferably from 0.5 to 3 MPaG.

Fluidized bed-type gas phase polymerization reactors that may be used include known reactors, such as the reactors described in Japanese Patent Application Laid-open No. S58-201802, Japanese Patent Application Laid-open No. S59-126406 and Japanese Patent Application Laid-open No. H2-233708. Fluidized bed-type gas phase polymerization is a process in which a monomer in a gaseous state is used as the medium and, while maintaining primarily an olefin polymerization catalyst and olefin polymer in a fluidized state within the medium by the flow of the medium, the monomer in the gaseous state is polymerized. In some cases, an agitator is also provided to promote fluidization. The polymerization temperature is generally from 0 to 120° C., preferably from 20 to 100° C., and more preferably from 40 to 100° C. The polymerization pressure should be in a range at which the olefin can be present as a vapor phase within the fluidized bed-type reactor, and is generally from standard pressure to 10 MPaG, preferably from 0.2 to 8 MPaG, and more preferably from 0.5 to 5 MPaG.

Combinations of different reactors are exemplified by a slurry polymerization reactor or a bulk polymerization reactor, to which is connected, as the subsequent stage, a fluidized bed-type gas phase polymerization reactor or a stirred tank-type gas phase polymerization reactor.

Alternatively, a flushing tank for separating unreacted olefin or polymerization solvent from olefin polymer particles may generally be provided between a slurry polymerization reactor or a bulk polymerization reactor and, connected thereto as the subsequent stage, a gas phase polymerization reactor such as a fluidized bed-type gas phase polymerization reactor, a stirred tank-type gas phase polymerization reactor or the subsequently described olefin polymerization reactor 10A. However, it is not always essential to install a flushing tank between the bulk polymerization reactor and the gas phase polymerization reactor subsequent thereto.

Olefin Polymerization Reactor

The olefin polymerization reactor 10A is a reactor which carries out, in a substantially gas phase state, an olefin polymerization reaction on polyolefin particles formed by the olefin prepolymerization reactor 5.

The olefin polymerization reactor 10A shown in FIG. 1 is constructed so as to be capable of forming a single spouted bed 8, and is composed primarily of a cylinder 12A which extends vertically, a closing plate 15 which closes a top end of the cylinder 12A, a deflector 20 provided inside the cylinder 12A, and a tubular baffle (decreasing diameter member) 30 provided at a bottom end of the cylinder 12A. It is preferable for both the deflector 20 and the tubular baffle 30 to be disposed coaxially with the center axis of the cylinder 12A. From the standpoint of stabilizing the spouted bed, the cylinder 12A has an inside diameter of preferably not more than 5 m, and more preferably not more than 3.5 m. In the olefin polymerization reactor 10A, a reaction zone (treatment zone) 25 is formed between a bottom surface of the closing plate 15, an inside surface of the cylinder 12A and an inside surface of the tubular baffle 30.

Within the reaction zone 25, an olefin-containing gas flows upward at a high velocity from a gas inlet orifice formed at a bottom end 30b of the tubular baffle 30, thereby forming a spouted bed 8 of polyolefin particles (FIG. 1). The spouted bed 8 is made of a spout portion 8a and an annular particle bed 8b.

The tubular baffle 30 is a tapered cylinder which has an inside diameter that decreases progressively in the downward direction, and is formed at a bottom end of the cylinder 12A. The gas inlet orifice formed at the bottom end 30b of the tubular baffle 30 may have disposed thereon a check valve (not shown) so that polyolefin particles within the reaction zone 25 do not flow downward through the gas inlet orifice at such times as startup or temporary shutdown of the olefin polymerization reactor 10A.

In the reaction zone 25, a deflector 20 is disposed at a position that lies above the tubular baffle 30 and faces the gas inlet orifice. The role of the deflector 20 is to prevent spouted polyolefin particles from scattering. This makes it possible to shorten the freeboard zone, enabling a high volume efficiency to be achieved.

The deflector 20 has a conical shape with a top end 20a that is closed, an outside diameter which increases progressively downward, and a bottom end 20b that is spaced apart from the inside wall of the cylinder 12A. Particles that have been blown upward collide with the inside surface of the deflector 20 and are taken up into the annular particle bed portion 8b of the spouted bed 8. At the same time, gases pass below the bottom end 20b and are discharged from gas discharge nozzles 70.

Gas discharge nozzles 70 are formed in the cylinder 12A which defines the sidewall surface of the reaction zone 25 so as to enable gases to be discharged from within the reaction zone 25. In the olefin polymerization reactor 10A according to the present embodiment, four gas discharge nozzles 70 are formed at substantially equal intervals along the circumferential direction of the cylinder 12A. Gases which have flowed inward and upward from the gas inlet orifice of the tubular baffle 30, instead of being discharged directly from the top of the reaction zone 25, are discharged laterally through the four gas discharge nozzles 70, thereby making it possible to increase the amount of gas which diffuses into the annular particle bed portion 8b of the spouted bed 8. As a result, in the annular particle bed portion 8b of the spouted bed 8, the solid-gas contacting efficiency between the particles and the olefin-containing gas improves. The gas discharge nozzles 70 are preferably situated above the bottom end 20b of the deflector 20 within the reaction zone 25, and more preferably situated above even the top end 20a of the deflector 20. By positioning the gas discharge nozzles 70 at such a height, the amount of particles which are discharged from the gas discharge nozzles 70 together with the gas can be sufficiently reduced. Here, the cylinder 12A having four gas discharge nozzles 70 was described. However, the number of gas discharge nozzle 70 is not limited to four and it may be more than four or less than four. To discharge gas evenly, the number of gas discharge nozzle 70 is preferably at least two.

To form a stable spouted bed 8 in the reaction zone 25, it is desirable that the tubular baffle 30 satisfy the following condition. Namely, the ratio $d_A/d_B$ between the diameter $d_A$ of the gas inlet orifice at the bottom end 30b of the tubular baffle 30 and the inside diameter $d_B$ of the cylinder 12A is preferably 0.35 or less.

Also, the angle of inclination α30 of the tubular baffle 30 in FIG. 1, i.e., the angle of the inside surface of the tubular baffle 30 with the horizontal, is preferably at least the angle of repose for polyolefin particles present within the cylinder 12A. The angle of inclination α30 is more preferably at least the angle of repose and at least the angle at which the polyolefin particles can be completely discharged gravitationally. In this way, smooth downward movement of the polyolefin particles is achieved.

Although a spouted bed can be formed even using a flat plate with a gas inlet orifice formed therein instead of a tubular baffle 30, a region where particles do not fluidize will arise on such a flat plate near the inside surface of the cylinder 12A. As a result, due to poor heat removal in this region, the particles may fuse together into masses. To avoid such a situation, it is thus desirable for the tubular baffle 30 to have an angle of inclination α30 which, as noted above, is at least a given angle.

It is preferable for the deflector 20 in FIG. 1 to have an angle of inclination α20, i.e., the angle formed between the outside surface of the deflector 20 and the horizontal, which is at least the angle of repose for polyolefin particles present within the cylinder 12A. In this way, polyolefin particles can be adequately prevented from sticking to the deflector 20.

Polyolefin particles have an angle of repose of, for example, from about 35° to about 50°. The angles of inclination α30 and α20 are both preferably at least 55°.

The deflector 20 and the tubular baffle 30 are each attached to the cylinder 12A by supports (not shown). The supports have substantially no influence on gas flow and polyolefin flow. The cylinder 12A, deflectors 20 and tubular baffles 30 may be made of, for example, carbon steels and stainless steels such as "SUS 304" and "SUS 316L". As used herein, "SUS" refers to a stainless specification standardized by Japanese Industrial Standards (JIS). It is preferable to use "SUS 316L" when a catalyst which are high in corrosive ingredient (e.g., a halogen such as chlorine) is to be employed.

As shown in FIG. 1, a line L30 for feeding the olefin-containing gas is connected to the gas inlet orifice at the bottom end of the tubular baffle 30. The olefin-containing gas is fed into the reaction zone 25 by a compressor 54 disposed along the line L30. In addition to the gas feed nozzle 60, a discharge nozzle (not shown) which is capable of discharging polyolefin particles at the end of reactor operation may also be provided at the bottom of the cylinder 12A. Also, to reduce the amount of powder remaining inside the cylinder 12A at the end of reactor operation, it is preferable to provide an interior member in the shape of an inverted cone (not shown) at a position which does not interfere with gas flow at the bottom of the cylinder 12A.

A gas discharging line L40 coupled to the gas discharge nozzles 70 which discharge gas from the reaction zone 25 is provided at the top of the cylinder 12A. The gas discharged through the gas discharging line L40 has gas-entrained particles removed therefrom by an optionally furnished cyclone 62 and passes through cooling means or the like (not shown), then is recycled by line L30. A line L20 for supplying to line L30 an olefin-containing gas from the exterior is connected to this line L30.

A line L5 is connected to the cylinder 12A at a position higher than the region where the spouted bed 8 is formed in the cylinder 12A, and supplies polyolefin particles containing solid particles of an olefin polymerization catalyst to the reaction zone 25. In addition, a particle discharging line 35 is connected to the tubular baffle 30; polyolefin particles that have grown within the reaction zone 25 are discharged through the particle discharging line 35. Two valves V71 and V72 are arranged in series on this particle discharging line 35. The polyolefin particles can be discharged in the next step by successively opening and closing these valves.

Accordingly, in the present embodiment, a polymerization step which uses two reactors—i.e., an olefin prepolymerization reactor 5 and an olefin polymerization reactor 10A—is achieved. In this way, the olefin prepolymerization reactor 5 effects the polymerization and growth of polyolefin particles, creating relatively large polyolefin particles having a particle size of preferably at least 500 μm, more preferably at least 700 μm, and even more preferably at least 850 μm, thereby enabling the formation of a more stable spouted bed. However, it is also possible to have the polymerization step be one which uses only a single reactor and does not include an olefin prepolymerization reactor 5. In this case, an olefin polymerization catalyst or prepolymerization catalyst is fed directly to the olefin polymerization reactor 10A, and olefin polymerization is carried out. Alternatively, one or more additional olefin polymerization reactor, such as an olefin prepolymerization reactor 5 or an olefin polymerization reactor 10A, may be provided subsequent to the olefin polymerization reactor 10A so as to achieve a polymerization step having three or more stages.

Olefin, Polyolefin and Catalyst

Next, the olefin, polyolefin, catalyst and other substances used in the production system 100A according to the present embodiment are described.

In the olefin polymerization reactors and polyolefin production methods according to the present embodiment, polyolefin—i.e., olefin polymer (olefin homopolymer, olefin copolymer)—production is carried out by the polymerization of one or more olefin (homopolymerization or copolymerization). Examples of olefins that may be used in the present embodiment include ethylene, propylene, 1-butene, 1-pentene, 4-methyl-1-pentene, 5-methyl-1-hexene, 1-hexene, 1-heptene and 1-octene.

One or more of these olefins may be used. Alternatively, the olefin used may be changed in each polymerization step. In cases where polymerization is carried out as a multistage process, a different olefin may be used in each stage. When two or more olefins are used, examples of suitable olefin combinations that may be employed include propylene/ethylene, propylene/1-butene, propylene/ethylene/1-butene, ethylene/1-butene, ethylene/1-hexene and ethylene/1-octene. In addition to olefins, it is also possible to use at the same time various copolymeric ingredients such as dienes.

Olefin polymers (homopolymers, copolymers) such as propylene homopolymers, propylene/ethylene copolymers, propylene/1-butene copolymers and propylene/ethylene/1-butene copolymers may be advantageously produced in the present invention. The production of olefin polymers obtained by multistage polymerization in which the proportions of the monomer units serving as the polymer ingredients differ in the respective stages is especially preferred. For example, it is possible to form a multistage-polymerized olefin copolymer by feeding one type of olefin to an olefin prepolymerization reactor 5 and an olefin polymerization reactor 10A so as to form homopolymer particles, or copolymerizing the first olefin with a small amount of another olefin to form random copolymer particles, then feeding, in a subsequent stage, two or more types of olefin to these polymer particles in an additional olefin polymerization reactor such as an olefin prepolymerization reactor 5 or an olefin polymerization reactor 10A. This results in a narrow residence time distribution in the olefin polymerization reactor 10A, making it easy to achieve a fixed compositional ratio within the polymer particles. Such an approach is especially effective for reducing molding defects.

Examples of such polymers include propylene-propylene/ethylene polymers, propylene-propylene/ethylene-propylene/ethylene polymers, propylene/ethylene-propylene/ethylene polymers and propylene-propylene/ethylene/1-butene polymers. Here, a dash ("-") indicates the boundary between polymers, and a slash ("/") indicates that two or more olefins are copolymerized within the polymer. Of these, the production of multistage-polymerized propylene-based copolymers which are polymers having propylene-based monomer units, are called "high-impact polypropylene" (in Japan, also customarily called "polypropylene block copolymers"), and have crystalline propylene-based polymer segments and amorphous propylene-based polymer segments, is preferred. A multistage-type polymerized propylene-based copolymer can be prepared by the continuous multistage polymerization, in any order, of crystalline homopolypropylene segments or random copolymer segments obtained by copolymerizing a small amount of an olefin other than propylene, with amorphous rubber segments copolymerized from ethylene, propylene and, as an optional ingredient, an olefin other than ethylene and propylene, in the presence of the respective polymers. Such a copolymer has an intrinsic viscosity, as measured in 1,2,3,4-tetrahydronaphthalene at 135° C., which is preferably in a range of from 0.1 to 100 dl/g. This multistage polymerized polypropylene-based copolymer has excellent heat resistance, rigidity and impact resistance, and can therefore be used in automotive components such as bumpers and door trim, and in various packaging containers such as retortable food packaging containers.

Moreover, in the present embodiment, to broaden the molecular weight distribution of the olefin polymer, the olefin polymer components produced in respective polymerization steps may be given different molecular weights. The present invention is also advantageous for producing olefin polymers having a broad molecular weight distribution. For example, the intrinsic viscosity obtained by measurement as described above for the polymer component obtained in the polymerization step that produces the highest molecular weight polymer component is in a range of preferably from 0.5 to 100 dl/g, more preferably from 1 to 50 dl/g, and even more preferably from 2 to 20 dl/g. This intrinsic viscosity is at least five times the intrinsic viscosity of the polymer component obtained in the polymerization step that produces the lowest molecular weight polymer component. The present invention can advantageously produce an olefin polymer in which the amount of the polymer component obtained in the polymerization step which produces the highest molecular weight polymer component accounts for from 0.1 to 80 wt % of the olefin polymer.

The olefin polymerization catalyst used in the present embodiment may be a known addition polymerization catalyst used in olefin polymerization. Illustrative examples include Ziegler-type solid catalysts formed by contacting a solid catalyst component containing titanium, magnesium, a halogen and an electron donor (referred to below as "catalyst component A") with an organoaluminum compound component and an electron donor component; and metallocene-type solid catalysts prepared by supporting a metallocene compound and a cocatalyst component on a granular carrier. Combinations of these catalysts may also be used.

What is commonly referred to as a titanium/magnesium composite catalyst may be used as catalyst component A employed in the preparation of a Ziegler-type solid catalyst. This composite catalyst may be obtained by contacting a titanium compound, a magnesium compound and an electron donor such as the following.

Titanium compounds that may be used to prepare catalyst component A are exemplified by titanium compounds having the general formula $Ti(OR^1)_a X_{4-a}$ (where $R^1$ is a hydrocarbon group of 1 to 20 carbons, X is a halogen atom, and the letter a is a number such that $0 \leq a \leq 4$). Illustrative examples include tetrahalogenated titanium compounds such as titanium tetrachloride; trihalogenated alkoxytitanium compounds such as ethoxytitanium trichloride and butoxytitanium trichloride; dihalogenated dialkoxytitanium compounds such as diethoxytitanium dichloride and dibutoxytitanium dichloride; monohalogenated trialkoxytitanium compounds such as triethoxytitanium chloride and tributoxytitanium chloride; and tetraalkoxytitanium compounds such as tetraethoxytitanium and tetrabutoxytitanium. These titanium compounds may be used singly or as combinations of two or more thereof.

Magnesium compounds that may be used to prepare catalyst component A are exemplified by magnesium compounds which have a magnesium-carbon bond or a magnesium-hydrogen bond and have a reducing ability, and magnesium compounds which lack a reducing ability. Illustrative examples of magnesium compounds which have a reducing ability include dialkylmagnesium compounds such as dimethylmagnesium, diethylmagnesium, dibutylmagnesium and butylethylmagnesium; alkylmagnesium halides such as butylmagnesium chloride; alkylalkoxymagnesium compounds such as butylethoxymagnesium; and alkylmagnesium hydrides such as butylmagnesium hydride. These magnesium compounds having a reducing ability may also be used in the form of a complex compound with an organoaluminum compound.

Illustrative examples of magnesium compounds which lack a reducing ability include dihalogenated magnesium compounds such as magnesium dichloride; alkoxymagnesium halides such as methoxymagnesium chloride, ethoxymagnesium chloride and butoxymagnesium chloride; dialkoxymagnesium compounds such as diethoxymagnesium and dibutoxymagnesium; and magnesium carboxylates such as magnesium laurate and magnesium stearate. These magnesium compounds which lack a reducing ability may be compounds which are synthesized, either in advance or at the time of catalyst component A preparation, by a known method from a magnesium compound having a reducing ability.

Electron donors that may be used to prepare catalyst component A include oxygen-containing electron donors such as alcohols, phenols, ketones, aldehydes, carboxylic acids, esters of organic or inorganic acids, ethers, acid amides and acid anhydrides; nitrogen-containing electron donors such as ammonia, amines, nitrites and isocyanates; and organic acid halides. Of these electron donors, the use of inorganic acid esters, organic acid esters and ethers is preferred.

Preferred inorganic acid esters include silicon compounds having the general formula $R^2{}_n Si(OR^3)_{4-n}$ (where $R^2$ is a hydrocarbon group of 1 to 20 carbons or a hydrogen atom, $R^3$ is a hydrocarbon group of 1 to 20 carbons, and the letter n is a number such that $0 \leq n < 4$). Illustrative examples include tetraalkoxysilanes such as tetramethoxysilane, tetraethoxysilane and tetrabutoxysilane; alkyltrialkoxysilanes such as methyltrimethoxysilane, ethyltrimethoxysilane, butyltrimethoxysilane, isobutyltrimethoxysilane, t-butyltrimethoxysilane, methyltriethoxysilane, ethyltriethoxysilane, butyltriethoxysilane, isobutyltriethoxysilane and t-butyltriethoxysilane; and dialkyldialkoxysilanes such as dimethyldimethoxysilane, diethyldimethoxsilane, dibutyldimethoxysilane, diisobutyldimethoxysilane, di-t-butyldimethoxysilane, butylmethyldimethoxysilane, butylethyldimethoxysilane, t-butylmethyldimethoxysilane, dimethyldiethoxysilane, diethyldiethoxysilane, dibutyldiethoxysilane, diisobutyldiethoxysilane, di-t-butyldiethoxysilane, butylmethyldiethoxysilane, butylethyldiethoxysilane and t-butylmethyldiethoxysilane.

Preferred organic acid esters include monofunctional and polyfunctional carboxylic acid esters, such as aliphatic carboxylic acid esters, alicyclic carboxylic acid esters and aromatic carboxylic acid esters. Illustrative examples include methyl acetate, ethyl acetate, methyl propionate, ethyl propionate, ethyl butyrate, ethyl valerate, methyl acrylate, ethyl acrylate, methyl methacrylate, ethyl benzoate, butyl benzoate, methyl toluate, ethyl toluate, ethyl anisate, diethyl succinate, dibutyl succinate, diethyl malonate, dibutyl malonate, dimethyl maleate, dibutyl maleate, diethyl itaconate, dibutyl itaconate, diethyl phthalate, di-n-butyl phthalate and diisobutyl phthalate. Preferred examples include unsaturated aliphatic carboxylic acid esters such as methacrylic acid esters, and maleic acid esters and phthalic acid esters. Phthalic acid diesters are more preferred.

Illustrative examples of ethers include dialkyl ethers such as diethyl ether, dibutyl ether, diisobutyl ether, diamyl ether, diisoamyl ether, methyl butyl ether, methyl isoamyl ether and ethyl isobutyl ether. Preferred examples include dibutyl ether and diisoamyl ether.

Illustrative examples of organic acid halides include mono- and polyfunctional carboxylic acid halides, such as aliphatic carboxylic acid halides, alicyclic carboxylic acid halides and aromatic carboxylic acid halides. Illustrative examples include acetyl chloride, propionyl chloride, butyryl chloride, valeroyl chloride, acryloyl chloride, methacryloyl chloride, benzoyl chloride, toluoyl chloride, anisoyl chloride, succinyl chloride, malonyl chloride, maleyl chloride, itaconyl chloride and phthaloyl chloride. Preferred examples include aromatic carboxylic acid chlorides such as benzoyl chloride, toluoyl chloride and phthaloyl chloride. Phthaloyl chloride is especially preferred.

Examples of methods for preparing catalyst component A include the following.

(1) Reacting a liquid magnesium compound, or a complex compound of a magnesium compound and an electron donor, with a precipitating agent, then treating with a titanium compound or with a titanium compound and an electron donor.

(2) Treating a solid magnesium compound, or a complex compound of a solid magnesium compound and an electron donor, with a titanium compound or with a titanium compound and an electron donor.

(3) Reacting a liquid magnesium compound with a liquid titanium compound in the presence of an electron donor, and inducing the precipitation of a solid titanium complex.

(4) Further treating the reaction product obtained in method (1), (2) or (3) above with a titanium compound, or with an electron donor and a titanium compound.

(5) A method in which a solid product obtained by reducing an alkoxytitanium compound with an organomagnesium compound such as a Grignard reagent in the presence of an organosilicon compound having a Si—O bond is treated with an ester compound, an ether compound and titanium tetrachloride.

(6) A method in which a solid product obtained by reducing a titanium compound with an organomagnesium compound in the presence of an organosilicon compound or an organosilicon compound and an ester compound is treated by adding, in order, a mixture of an ether compound and titanium tetrachloride, followed by an organic acid halide compound, and the treated solid is subsequently treated with a mixture of an ether compound and titanium tetrachloride or a mixture of an ether compound, titanium tetrachloride and an ester compound.

(7) A method in which the product of the contact catalysis of a metal oxide, dihydrocarvyl magnesium and a halogen-containing alcohol is contacted with an electron donor and a titanium compound, either following treatment with a halogenating agent or without such treatment.

(8) A method in which a magnesium compound such as the magnesium salt of an organic acid or an alkoxymagnesium is contacted with an electron donor and a titanium compound, either following treatment with a halogenating agent or without such treatment.

(9) Treating the compound obtained in any of methods (1) to (8) above with a halogen, a halogen compound or an aromatic hydrocarbon.

Of the above methods for preparing catalyst component A, methods (1) to (6) are preferred. These methods of preparation are generally all carried out in an inert gas atmosphere, such as nitrogen or argon.

In the preparation of catalyst component A, the titanium compound, organosilicon compound and ester compound are preferably used after dissolution or dilution in a suitable solvent. Illustrative examples of such solvents include aliphatic hydrocarbons such as hexane, heptane, octane and decane; aromatic hydrocarbons such as toluene and xylene; alicyclic hydrocarbons such as cyclohexane, methylcyclohexane and decalin; and ether compounds such as diethyl ether, dibutyl ether, diisoamyl ether and tetrahydrofuran.

In the preparation of catalyst component A, the temperature of the reducing reaction which uses an organomagnesium compound is generally from −50 to +70° C. From the standpoint of catalyst activity and cost, the temperature is preferably from −30 to +50° C., and more preferably from −25 to +35° C. The dropwise addition time for the organomagnesium compound, while not subject to any particular limitation, is generally from about 30 minutes to about 12 hours. Following completion of the reducing reaction, subsequent reactions may be carried out at a temperature of from 20 to 120° C.

In the preparation of catalyst component A, the reducing reaction may be carried out in the presence of a porous material such as an inorganic oxide or an organic polymer so as to allow the solid product to impregnate into the porous material. Such porous materials preferably have a pore volume at a pore radius of from 20 to 200 nm of at least 0.3 ml/g and an average particle size of from 5 to 300 μm. Examples of porous inorganic oxides include $SiO_2$, $Al_2O_3$, MgO, $TiO_2$, $ZrO_2$ and composite oxides thereof. Examples of porous polymers include polystyrene-based porous polymers such as polystyrene and styrene-divinylbenzene copolymers; polyacrylate-based porous polymers such as polyethyl acrylate, methyl acrylate-divinyl benzene copolymers, polymethyl methacrylate and methyl methacrylate-divinylbenzene copolymers; and polyolefin-based porous polymers such as polyethylene, ethylene-methyl acrylate copolymers and polypropylene. Of these porous substances, $SiO_2$, $Al_2O_3$ and styrene-divinylbenzene copolymers are preferred.

The organoaluminum compound component used in the preparation of a Ziegler solid catalyst has at least one aluminum-carbon bond on the molecule and may typically have one of the following general formulas.

$R^4{}_m AlY_{3-m}$ $R^5 R^6 Al\text{—}O\text{—}AlR^7 R^8$

In the above formulas, $R^4$ to $R^8$ are each hydrocarbon groups having from 1 to 8 carbons, and Y is a halogen atom, hydrogen or an alkoxy group. $R^4$ to $R^8$ may each be the same or different. Also, the letter m is a number such that $2 \leq m \leq 3$.

Illustrative examples of the organoaluminum compound component include trialkylaluminums such as triethylaluminum and triisobutylaluminum; dialkylaluminum hydrides such as diethylaluminum hydride and diisobutylaluminum hydride; dialkylaluminum halides such as diethylaluminum chloride and diisobutylaluminum chloride; mixtures of a trialkylaluminum with a dialkylaluminum halide, such as a mixture of triethylaluminum with diethylaluminum chloride; and alkylalumoxanes such as tetraethyldialumoxane and tetrabutyldialumoxane. Of these organoaluminum compounds, the use of a trialkylaluminum, a mixture of a trialkylaluminum with a dialkylaluminum halide, or an alkylalumoxane is preferred. The use of triethylaluminum, triisobutylaluminum, a mixture of triethylaluminum and diethylaluminum chloride, or tetraethyldialumoxane is more preferred.

Examples of the electron donor component used in the preparation of a Ziegler solid catalyst include the following commonly used electron donors: oxygen-containing electron donors such as alcohols, phenols, ketones, aldehydes, carboxylic acids, the esters of organic or inorganic acids, ethers, acid amides and acid anhydrides; and nitrogen-containing electron donors such as ammonia, amines, nitrites and isocyanates. Of these electron donor components, inorganic acid esters and ethers are preferred.

Preferred inorganic acid esters include silicon compounds of the general formula $R^9{}_n Si(OR^{10})_{4-n}$ (where $R^9$ is a hydrocarbon group of 1 to 20 carbons or a hydrogen atom, $R^{10}$ is a hydrocarbon group of 1 to 20 carbons, and the letter n is such that $0 \leq n < 4$). Illustrative examples include tetrabutoxysilane, butyltrimethoxysilane, tert-butyl-n-propyldimethoxysilane, dicyclopentyldimethoxysilane and cyclohexylethyldimethoxysilane.

Preferred ethers include dialkyl ethers, and diether compounds of the general formula In the above formula, $R^{11}$ to $R^{14}$ are each independently a linear or branched alkyl, alicyclic hydrocarbon, aryl or aralkyl group of 1 to 20 carbons, although $R^{11}$ or $R^{12}$ may be a hydrogen atom. Illustrative examples include dibutyl ether, diamyl ether, 2,2-diisobutyl-1,3-dimethoxypropane and 2,2-dicyclopentyl-1,3-dimethoxypropane.

Of these electron donor components, an organosilicon compound of the general formula $R^{15}R^{16}Si(OR^{17})_2$ is especially preferred. Here, $R^{15}$ is a hydrocarbon group of 3 to 20 carbons in which the carbon atoms neighboring the silicon are secondary or tertiary. Illustrative examples include branched chain alkyl groups such as isopropyl, sec-butyl, tert-butyl and tert-amyl; cycloalkyl groups such as cyclopentyl and cyclohexyl; cycloalkenyl groups such as cyclopentenyl; and aryl groups such as phenyl and tolyl. In this formula, $R^{16}$ is a hydrocarbon group of 1 to 20 carbons, illustrative examples of which include straight chain alkyl groups such as methyl, ethyl, propyl, butyl and pentyl; branched chain alkyl groups such as isopropyl, sec-butyl, tert-butyl and tert-amyl; cycloalkyl groups such as cyclopentyl and cyclohexyl; cycloalkenyl groups such as cyclopentenyl; and aryl groups such as phenyl and tolyl. Also, in the above formula, $R^{17}$ is a hydrocarbon group of 1 to 20 carbons, and is preferably a hydrocarbon group of 1 to 5 carbons. Illustrative examples of organosilicon compounds that may be used as such electron donor components include tert-butyl-n-propyldimethoxysilane, dicyclopentyldimethoxysilane and cyclohexylethyldimethoxysilane.

In the preparation of a Ziegler solid catalyst, the organoaluminum compound component is used in an amount, per mole of titanium atoms in catalyst component A, of generally from 1 to 1,000 moles, and preferably from 5 to 800 moles. The electron donor component is used in an amount, per mole of titanium atoms in catalyst component A, of generally from 0.1 to 2,000 moles, preferably from 0.3 to 1,000 moles, and more preferably from 0.5 to 800 moles.

Catalyst component A, the organoaluminum compound component and the electron donor component may be brought into mutual contact before being fed to the multistage polymerization reactor, or may be separately fed to the multistage polymerization reactor, then contacted within the reactor. Alternatively, any two of these components may first be contacted with each other, and the remaining component subsequently brought into contact, or the respective components may be brought into mutual contact in a plurality of divided portions.

Examples of metallocene compounds that may be used to prepare the metallocene-type solid catalyst include transition metal compounds of the following general formula.

$L_x M$

In the formula, M is a transition metal, x is a number which satisfies the atomic valence of the transition metal M, and L is a ligand attached to the transition metal. At least one occurrence of L is a ligand having a cyclopentadienyl skeleton.

The transition metal M is preferably an atom from groups 3 to 6 of the Periodic Table of the Elements (IUPAC, 1989), and more preferably titanium, zirconium or hafnium.

Ligands L having a cyclopentadienyl skeleton are exemplified by (substituted) cyclopentadienyl groups, (substituted) indenyl groups and (substituted) fluorenyl groups. Illustrative examples include cyclopentadienyl, methylcyclopentadienyl, tert-butylcyclopentadienyl, dimethylcyclopentadienyl, tert-butylmethylcyclopentadienyl, methylisopropylcyclopentadienyl, trimethylcyclopentadienyi, tetramethylcyclopentadienyl, pentamethylcyclopentadienyl, indenyl, 4,5,6,7-tetrahydroindenyl, 2-methylindenyl, 3-methylindenyl, 4-methylindenyl, 5-methylindenyl, 6-methylindenyl, 7-methylindenyl, 2-tert-butylindenyl, 3-tert-butylindenyl, 4-tert-butylindenyl, 5-tert-butylindenyl, 6-tert-butylindenyl, 7-tert-butylindenyl, 2,3-dimethyindeyl, 4,7-dimethylindenyl, 2,4,7-trimethylindenyl, 2-methyl-4-isopropylindenyl, 4,5-benzindenyl, 2-methyl-4,5-benzindenyl, 4-phenyindenyl, 2-methyl-5-phenyindenyl, 2-methyl-4-phenyindenyl, 2-methyl-4-naphthylindenyl, fluorenyl, 2,7-dimethylfluorenyl, 2,7-di-tert-butylfluorenyl and substituted versions of the above. In cases where there are a plurality of ligands having a cyclopentadienyl skeleton, these ligands may be mutually like or unlike.

Ligands L other than those having a cyclopentadienyl skeleton are exemplified by heteroatom-bearing groups, halogen atoms and hydrocarbon groups (excluding groups having a cyclopentadiene-type anion skeleton).

Examples of the heteroatom in the heteroatom-bearing group include oxygen, sulfur, nitrogen and phosphorus atoms. Such groups are exemplified by alkoxy groups, aryloxy groups, thioalkoxy groups, thioaryloxy groups, alkylamino groups, arylamino groups, alkylphosphino groups, arylphosphino groups, and aromatic or aliphatic heterocyclic groups having on the ring at least one atom selected from among oxygen, sulfur, nitrogen and phosphorus atoms. Illustrative examples of the halogen atoms include fluorine, chlorine, bromine and iodine atoms. The hydrocarbon groups are exemplified by alkyl, aralkyl, aryl and alkenyl groups.

Two or more ligands L may be directly linked to each other or may be linked through a residue containing at least one type of atom selected from among carbon, silicon, nitrogen, oxygen, sulfur and phosphorus atoms. Illustrative examples of such residues include alkylene groups such as methylene, ethylene and propylene; substituted alkylene groups such as dimethylmethylene (isopropylidene) and diphenylmethylene; silylene groups; substituted silylene groups such as dimethylsilylene, diethylsilylene, diphenylsilylene, tetramethyldisilylene and dimethoxysilylene; and heteroatoms such as nitrogen, oxygen, sulfur and phosphorus. Of these, methylene, ethylene, dimethylmethylene (isopropylidene), diphenylmethylene, dimethylsilylene, diethylsilylene, diphenylsilylene and dimethoxysilylene are especially preferred.

Illustrative examples of metallocene compounds include bis(cyclopentadienyl)zirconium dichloride, bis(methylcyclopentadienyl)zirconium dichloride, bis(indenyl)zirconium dichloride, bis(4,5,6,7-tetrahydroindenyl)zirconium dichloride, ethylenebis(indenyl)zirconium dichloride, dimethylsilylenebis(trimethylcyclopentadienyl)zirconium dichloride, dimethylsilylenebis(indenyl)zirconium dichloride and dimethylsilyl(tetramethylcyclopentadienyl)(3,5-di-tert-butyl-2-phenoxy) titanium dichloride. Additional examples include compounds in which the dichloride has been substituted with dimethoxide or diphenoxide groups.

Cocatalyst components that may be used in the preparation of metallocene-type solid catalysts include organoaluminumoxy compounds, organoaluminum compounds and boron compounds.

Illustrative examples of the organoaluminumoxy compounds include tetramethyldialuminoxane, tetraethyldialuminoxane, tetrabutyldialuminoxane, tetrahexyldialuminoxane, methylaluminoxane, ethylaluminoxane, butylaluminoxane and hexylaluminoxane.

Illustrative examples of organoaluminum compounds include trimethylaluminum, triethylaluminum, tri-n-butylaluminum, triisobutylaluminum and tri-n-hexylaluminum.

Illustrative examples of boron compounds include tris(pentafluorophenyl)borane, triphenylcarbenium tetrakis(pentafluorophenyl) borate, tri(n-butyl)ammonium tetrakis(pentafluorophenyl) borate and N,N-dimethylanilinium tetrakis(pentafluorophenyl) borate.

The granular carrier that may be used in the preparation of metallocene solid catalysts is preferably a porous substance, illustrative examples of which include inorganic oxides such as $SiO_2$, $Al_2O_3$, MgO, $ZrO_2$, $TiO_2$, $B_2O_3$, CaO, ZnO, BaO and $ThO_2$; clays or clayey minerals such as smectite, montmorillonite, hectorite, laponite and saponite; and organic polymers such as polyethylene, polypropylene and styrene-divinyl benzene copolymer.

Metallocene-type solid catalysts that may be used include those mentioned in, for example, Japanese Patent Application Laid-open No. S60-35006, Japanese Patent Application Laid-open No. S60-35007, Japanese Patent Application Laid-open No. S60-35008, Japanese Patent Application Laid-open No. S61-108610, Japanese Patent Application Laid-open No. S61-276805, Japanese Patent Application Laid-open No. S61-296008, Japanese Patent Application Laid-open No. S63-89505, Japanese Patent Application Laid-open No. H3-234709, Japanese Translation of PCT Application No. H5-502906, Japanese Patent Application Laid-open No. H6-336502 and Japanese Patent Application Laid-open No. H7-224106.

When a metallocene-type solid catalyst is used in olefin polymerization, a cocatalyst component such as an organoaluminum compound or a boron compound may be used together if necessary. In such cases, the metallocene-type solid catalyst and the cocatalyst component may be brought into mutual contact prior to being fed into the polymerization reactor, or may be separately fed into the polymerization reactor and contacted within the reactor. Alternatively, the respective components may be brought into mutual contact in a plurality of divided portions.

The mass mean particle diameter of the above olefin polymerization catalyst is generally from 5 to 150 μm. In a gas phase polymerization reactor in particular, to suppress the scattering of particles to the reactor exterior, it is desirable to use a catalyst having a mass mean particle diameter of preferably at least 10 μm, and more preferably at least 15 μm. The polymerization catalyst in the present embodiment may include additives such as a fluidization aid and an antistatic additive. Together with the polymerization catalyst of the present embodiment, concomitant use may also be made of a chain transfer agent such as hydrogen for the purpose of regulating the molecular weight of the polymer.

The olefin polymerization catalyst may be a so-called prepolymerization catalyst which first induces polymerization in a small amount of olefin. Examples of olefins that may be used in prepolymerization include the olefins that may be used in the above-described polymerization. In this case, a single type of olefin may be used alone, or two or more different olefins may be used together.

Methods for producing the prepolymerization catalyst include, but are not limited to, slurry polymerization and gas phase polymerization. Of these, slurry polymerization is preferred. The use of the latter in production is sometimes economically advantageous. Production may be carried out using a batch system, a semibatch-type system or a continuous system.

The mass mean particle diameter of the prepolymerization catalyst is generally from 5 to 1000 μm. In a gas phase polymerization reactor in particular, to minimize scatter to the exterior of the reactor, the mass mean particle diameter is preferably at least 10 μm, and more preferably at least 15 μm. Moreover, it is desirable for the amount of prepolymerization catalyst having a particle diameter of less than 20 μm, and especially less than 10 μm, to be low.

The polymerization catalyst may be introduced into the reactor as a suspension in a hydrocarbon solvent or the like. Introduction by entrainment with monomer gas or an inert gas such as nitrogen is also possible.

Next, a process for producing polyolefin in such a system is described.

First, polyolefin particles containing a catalyst component having polymerization activity are formed in the olefin prepolymerization reactor 5 by a known method using an olefin polymerization catalyst.

Separately from the above, an olefin-containing gas is fed via line L30 into the cylinder 12A in the olefin polymerization reactor 10A, the pressure is raised to polymerization pressure, and the interior of the cylinder 12A is heated. The polymerization pressure, which may be any pressure within a range at which the olefin is capable of being present in the reactor as a gas phase, is generally from standard pressure to 10 MPaG, preferably from 0.2 to 8 MPaG, and more preferably from 0.5 to 5 MPaG. At a polymerization pressure below standard pressure, the productivity may decrease. On the other hand, at a reaction pressure above 10 MPaG, equipment costs for the reactor may become high. The polymerization temperature varies according to the type of monomer, the molecular weight of the product and other factors, although a temperature below the melting point of the olefin polymer, and preferably at least 10° C. lower than the melting point, is desirable. Specifically, the temperature is preferably from 0 to 120° C., more preferably from 20 to 100° C., and even more preferably from 40 to 100° C. It is preferable to carry out polymerization in an environment which is substantially free of moisture. The presence of moisture may lower the polymerization activity of the polymerization catalyst. Also, the presence of excess oxygen, carbon monoxide or carbon dioxide within the polymerization reaction system may lower the polymerization activity.

Next, polyolefin particles having a particle diameter of from about 0.5 mm to about 5.0 mm which have been obtained separately by a known method are fed into the cylinder 12A through a feed line L6 connected to line L5. The polyolefin particles fed into the cylinder 12A are most often particles which do not contain a catalyst component having a polymerization activity, although the presence within the particles of a catalyst component having a polymerization activity is acceptable.

When the polyolefin particles are fed into the cylinder 12A through feed line L6 while the olefin-containing gas is fed into the reaction zone 25 through line L30, as shown in FIG. 1, a spouted bed 8 of polyolefin particles is formed within the reaction zone 25. That is, under the action of the gas from the gas inlet orifice, there forms a spout portion 8a which has a dilute particle concentration near the center axis of the cylinder 12A in the reaction zone 25 and in which particles flow upward together with the gas, and at the same time there also forms at the periphery thereof an annular particle bed 8b where particles fall in a moving bed state under the influence of gravity, giving rise to the circulatory movement of particles within the reaction zone 25.

Once a spouted bed 8 has been formed within the reaction zone 25, the polyolefin particles containing a catalyst component having a polymerization activity that were formed in the olefin prepolymerization reactor 5 are fed from line L5 into the cylinder 12A at a constant rate per unit time, thereby commencing steady-state operation of the olefin polymerization reactor 10A.

Part of the olefin monomer-containing gas forms a spout portion 8a and sweeps past the particle bed, while the remainder of the gas diffuses into the annular particle bed 8b. In this way, the olefin-containing gas and the polyolefin particles containing a catalyst component having a polymerization activity undergo solid-gas contact, and the action of the catalyst within the polyolefin particles causes the olefin polymerization reaction to proceed, resulting in growth of the polyolefin particles. The polyolefin particles that have grown within the reaction zone 25 are discharged through the particle discharging line 35.

For a stable spouted bed 8 to form in the reaction zone 25, it is preferable that the following operating condition be satisfied; i.e., that the gas superficial velocity $U_0$ be equal to or greater than the minimum gas superficial velocity Ums at which a spouted bed is capable of forming. In addition to the physical properties of the powder and gases being handled, the minimum gas superficial velocity Ums is also influenced by the shape of the polymerization reactor. Various formulas have been proposed for calculating the minimum gas superficial velocity Ums. One example is formula (1) below.

$$Ums = \frac{d_p}{d_B}\left(\frac{d_A}{d_B}\right)^{1/3} \sqrt{\frac{2gL_S(\rho_S - \rho_G)}{\rho_G}} \times \left(\frac{\rho_G}{\rho_{AIR}}\right)^{0.2} \quad (1)$$

In this formula, $d_P$ is the particle diameter, $\rho_S$ is the particle density, $\rho_G$ is the gas density under the pressure and temperature conditions of the reaction zone, $\rho_{AIR}$ is the density of air under room temperature conditions, and $L_S$ is the height of the spouted bed.

The spouted bed height $L_S$ within reaction zone 25 is equal to or less than the maximum spouted bed height $Ls_{MAX}$ m at which a spouted bed is capable of forming, and is not subject to any particular limitation provided it is equal to or less than the maximum spouted bed height $Ls_{MAX}$. Various formulas for calculating the maximum spouted bed height $Ls_{MAX}$ have been proposed, one of which is formula (2) below.

$$\frac{Ls_{MAX}}{d_B} = \frac{d_B}{d_A}\left\{0.218 + \frac{0.005(\rho_S - \rho_G)gd_A}{\rho_G u_t u_{mf}}\right\} \quad (2)$$

In this formula, $u_t$ is the terminal velocity of the particles, and $u_{mf}$ is the minimum fluidization velocity.

From the standpoint of volume efficiency and enabling the formation of a more stable spouted bed, it is preferable for the spouted bed height $L_s$ to be higher than the tubular baffle 30.

The following effects are achieved with the olefin polymerization reactor 10A according to the present embodiment. That is, because the gas within the reaction zone 25 can be discharged from the laterally disposed gas discharge nozzles 70, the amount of gas which diffuses into the annular particle bed 8b of the spouted bed 8 can be increased, enabling the solid-gas contact efficiency between the particles and the olefin-containing gas to be adequately increased. As a result, polyolefin particles can be efficiently grown.

Also, in the spouted bed 8 which is formed within the cylinder 12A of the olefin polymerization reactor 10A, the residence time distribution of particles can be made narrower than in a fluidized bed. Accordingly, when olefin polymer is continuously polymerized, by carrying out polymerization with a plurality of olefin polymerization reactors 10A arranged in series, for example, it is possible to produce olefin polymer having an excellent structural uniformity. Moreover, when the production conditions are to be changed, because polyolefin particles polymerized prior to the change in conditions can be easily discharged from the cylinder 12, the amount of off-specification product that arises as a result can be cut to a sufficient degree. Also, by providing a deflector 20 to suppress the scattering of spouted particles, the freeboard zone can be shortened, enabling a high volume efficiency to be achieved.

Second Embodiment

Figure 2:
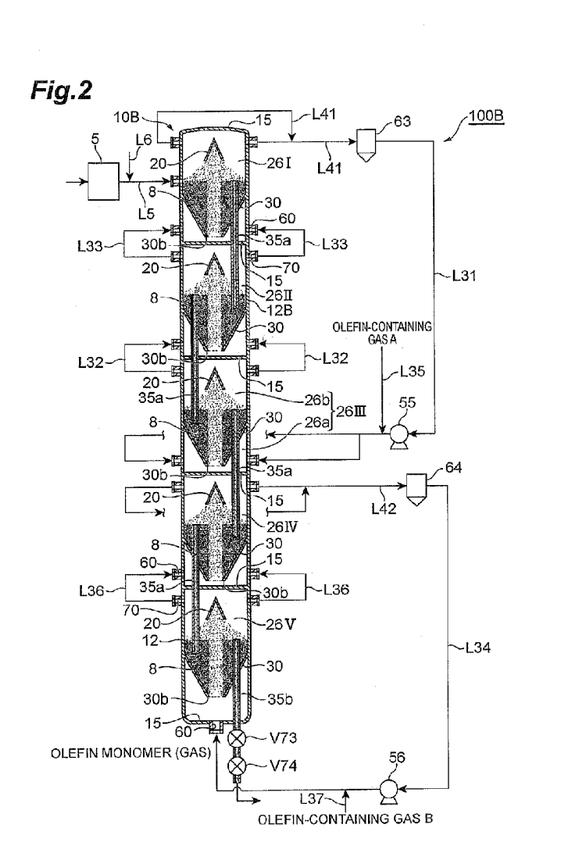
FIG. 2 is a schematic view of a second embodiment of the spouted bed device according to the present invention.

The polyolefin production system 100B according to a second embodiment of the invention, aside from employing an olefin polymerization reactor 10B which forms a plurality of spouted beds 8 instead of the olefin polymerization reaction 10A which forms a single spouted bed 8, has a construction similar to that of the polyolefin production system 100A according to the first embodiment of the invention. The following explanation of the second embodiment deals principally with those features that differ from those in the above-described first embodiment.

As shown in FIG. 2, the olefin polymerization reactor 10B is constructed so as to be capable of forming five spouted beds 8 in the vertical direction. The olefin polymerization reactor 10B is composed primarily of a cylinder 12B which extends vertically, a total of six closed plates 15 which close both ends of the cylinder 12B and partition the interior of the cylinder 12B into five spaces 26I to 26V, five deflectors 20 which are provided within the cylinder 12B, and five tubular baffles 30 which are provided within the cylinder 12B.

Five spaces 26I to 26V are formed by the closing plates 15 at the interior of the cylinder 12B, which is constructed such that polymerization is carried out with an olefin-containing gas A in the top three spaces 26I to 26III and polymerization is carried out with an olefin-containing gas B in the bottom two spaces 26IV and 26V. Each space 26 is provided with a combination of a tubular baffle 30 and a deflector 20 situated above the tubular baffle 30. Preferably, the deflector 20 and the tubular baffle 30 are both disposed so as to be coaxial with the center axis of the cylinder 12B.

Each space 26 within the cylinder 12B is divided into two zones by a tubular baffle 30. That is, the space 26 is divided into a bottom zone 26a below the tubular baffle 30 and a reaction zone 26b above the tubular baffle 30. Within the reaction zone 26b, an olefin-containing gas flows inward and upward at a high velocity from the gas inlet orifice formed at the bottom end 30b of the tubular baffle 30, thereby forming a spouted bed 8 of polyolefin particles.

Gas feeding nozzles 60 for feeding gas to each reaction zone 26b are formed in the portions of the cylinder 12B that define the sidewalls of the bottom zones 26a. The gas fed in through the gas feeding nozzles 60 is introduced to the reaction zone 26b from the gas inlet orifice at the bottom end of the tubular baffle 30. In addition to the gas feeding nozzles 60, a discharge nozzle (not shown) which is capable of discharging polyolefin particles at the end of reactor operation may also be provided at the bottom of the cylinder 12B. Also, to reduce the amount of powder remaining inside the cylinder 12B at the end of reactor operation, it is preferable to provide an interior member in the shape of an inverted cone (not shown) at a position which does not interfere with gas flow at the bottom of the cylinder 12B.

Gas discharge nozzles 70 for discharging gas from each reaction zone 26b are formed in the portions of the cylinder 12B that define the sidewalls of the reaction zones 26b. Instead of discharging the gas that has entered and flowed upward through the gas inlet orifice in the tubular baffle 30 directly from the top of the reaction zone 26b, by discharging the gas laterally from the gas discharge nozzles 70 formed in the cylinder 12B, the amount of gas which diffuses into the annular particle bed portion 8b of the spouted bed 8 can be increased. As a result, in the annular particle bed portion 8b of the spouted bed 8, the solid-gas contacting efficiency between the particles and the olefin-containing gas improves. Moreover, each gas discharge nozzle 70 is situated preferably above the bottom end 20b of the deflector 20 within each reaction zone 26b and below the closing plate 15 directly thereabove, and more preferably above the top end 20a of the deflector 20 and below the closing plate 15 directly thereabove. By positioning the gas discharge nozzles 70 at such a height, the amount of particles discharged from the gas discharge nozzles 70 together with the gas can be reduced.

The deflectors 20 are each situated above the tubular baffle 30 in the respective spaces 26 and at positions facing the gas inlet orifice. The role of the deflectors 20 is to suppress the scattering of spouted polyolefin particles. This makes it possible to shorten the freeboard zones, enabling a high volume efficiency to be achieved.

As shown in FIG. 2, upper downcomers 35a are provided so as to pass through each of the four upper tubular baffles 30 within the cylinder 12B and also pass through the closing plates 15 directly below, and a bottom downcomer 35b is provided so as to pass through the bottommost tubular baffle 30. The upper downcomers 35a allow polyolefin particles to fall from an upper reaction zone 26b to a lower reaction zone 26b. The purpose of the bottom downcomer 35b is to remove polyolefin particles from the bottommost reaction zone 26b and discharge the particles outside of the cylinder 12B. Two valves V73 and V74 are arranged in series with the bottom downcomer 35b, thereby enabling the polyolefin particles to be discharged to the next step without the release of gases.

As shown in FIG. 2, a line L31 for supplying olefin-containing gas A is connected to the gas feeding nozzles 60 provided in the bottom zone 26a of the third space 26 from the top of the cylinder 12B. Moreover, olefin-containing gas A is supplied to the third space 26 by a compressor 55 disposed on the line L31.

The gas discharged from the third reaction zone 26b from the top of the cylinder 12B passes through a line L32 and is supplied to the second bottom zone 26a from the top. This line L32 communicates between the gas discharge nozzles 70 in the third reaction zone 26b and the gas feeding nozzles 60 in the second bottom zone 26a. Similarly, gas discharged from the second reaction zone 26b from the top of the cylinder 12B is supplied to the bottom zone 26a of the topmost space 26 through a line L33.

Gas discharging lines L41 are connected to the gas discharge nozzles 70 in the topmost reaction zone 26b. The gas discharged by means of the gas discharging lines L41 is again supplied to the third reaction zone 26b from the top of the cylinder 12B by line L31 after the removal of gas-entrained particles therefrom by an optionally installed cyclone 63 and after passing, for example, through cooling means (not shown). A line L35 is connected to this line L31 for the purpose of supplying olefin-containing gas A from the exterior to line L31.

A line L34 for supplying olefin-containing gas B is connected to the gas feeding nozzle 60 provided in the bottom zone 26a of the bottommost space 26. Moreover, olefin-containing gas B is supplied to the bottommost space 26 by a compressor 56 disposed on the line L34.

The gas discharged from the bottommost reaction zone 26b is supplied to the second bottom zone 26a from the bottom of the cylinder 12B via lines L36. These lines L36 communicate between gas discharge nozzles 70 in the bottommost reaction zone 26b and gas feeding nozzles 60 in the second bottom zone 26a from the bottom of the cylinder 12B.

A gas discharging line L42 is connected to the gas discharge nozzles 70 in the second reaction zone 26b from the bottom. The gas discharged through the gas discharging line L42 is again supplied to the bottommost reaction zone 26b by a line L34 after gas-entrained particles are removed therefrom by an optionally installed cyclone 64 and after passing through, for example, cooling means (not shown). A line L37 is connected to this line L34 for the purpose of supplying olefin-containing gas B from the exterior to line L34.

Also, a line L5 is connected at the top of the cylinder 12B, i.e., to a position which is higher than the region where a spouted bed 8 is formed in the topmost reaction zone 26b, for the purpose of supplying polyolefin particles containing solid particles of an olefin polymerization catalyst to the topmost reaction zone 26b.

Next, a process for producing polyolefin using the production system 100B according to the present embodiment is described.

First, polyolefin particles are formed in the olefin prepolymerization reactor 5 using an olefin polymerization catalyst obtained by a known method.

In the olefin polymerization reactor 10B, olefin-containing gases A and B are respectively fed into given spaces 26 within the cylinder 12B through lines L31 and L34 and pressurized to the polymerization pressure, and the interior of the cylinder 12B is warmed. The polymerization pressure, which should be within a range at which the olefin is capable of being present in a gas phase within the reactor, is generally from standard pressure to 5 MPaG, and preferably from 0.5 to 5 MPaG. The polymerization temperature is generally from 50 to 110° C., and preferably from 40 to 100° C.

Next, polyolefin particles having a particle size of from about 0.5 mm to about 5.0 mm obtained separately by a known method are fed into the cylinder 12B via a feed line L6 connected to line L5.

By feeding polyolefin particles into the cylinder 12B through feed line L6 while feeding respectively olefin-containing gases A and B to individual spaces 26 through lines L31 and L34, as shown in FIG. 2, spouted beds 8 of polyolefin particles are formed within each of the reaction zones 26b.

Once a spouted bed 8 has been formed within each reaction zone 26b, the polyolefin particles are fed from line L5 into the cylinder 12B at a constant rate per unit time, thereby commencing steady-state operation of the olefin polymerization reactor 10B. As the polyolefin particles grow within each reaction zone 26b, they successively fall through the upper downcomers 35a and into the reaction zone 26b below, and are eventually discharged from the bottom downcomer 35b.

Meanwhile, in each reaction zone 26b, part of the olefin monomer-containing gas forms a spout and sweeps past the particle bed, while the remainder of the gas diffuses into the annular particle bed 8b. In this way, the olefin-containing gas and the polyolefin particles undergo solid-gas contact and the action of the catalyst within the polyolefin particles causes the olefin polymerization reaction to proceed, resulting in growth of the polyolefin particles.

For a stable spouted bed 8 to form in each reaction zone 26b, it is preferable that the conditions described earlier in the first embodiment, i.e., the conditions relating to the gas superficial velocity $U_O$ and the spouted bed height $L_S$, be satisfied.

The olefin polymerization reactor 10B according to the present embodiment achieves the following types of effects. Because the gas within each reaction zone 26b can be discharged from the laterally disposed gas discharge nozzles 70, the amount of gas which diffuses into the annular particle bed 8b portion of the spouted bed 8 can be increased, enabling the solid-gas contacting efficiency between the particles and the olefin-containing gas to be made sufficiently high. As a result, polyolefin particles can be efficiently grown within each reaction zone 26b.

Also, a plurality of spouted beds 8 are formed within the cylinder 12B, making it possible to narrow the particle retention time distribution. Accordingly, when olefin polymer is continuously produced, it is possible to produce polymer having an excellent structural uniformity. Moreover, when the production conditions are to be changed, because polyolefin particles polymerized prior to the change in conditions can be easily discharged from the cylinder 12B, the amount of off-specification product that arises as a result can be cut to a sufficient degree. Also, by providing deflectors 20 to suppress the scattering of spouted particles, the freeboard zones can be shortened, enabling a high volume efficiency to be achieved.

The present invention is not limited to the above-described first and second embodiments. For example, the foregoing embodiments are exemplified above by cases in which an olefin-containing gas is fed into the cylinder 12A or 12B. However, an arrangement in which a liquid olefin monomer can be supplied to a suitable reaction zone is also possible. By adopting such an arrangement, the olefin monomer consumed by the polymerization reaction can be replenished. In addition, when the liquid olefin monomer evaporates, heat can be removed from the polyolefin particles by the latent heat of vaporization. In the multistage-type olefin polymerization reactor 10B according to the second embodiment, there is a tendency for higher reaction zones 26b within the cylinder 12B to have a higher temperature on account of the heat of reaction, resulting in a temperature difference with lower reaction zones 26b. By installing a spray nozzle or the like within the cylinder 12B and thereby supplying liquid olefin monomer to the upper reaction zones 26b, this temperature difference can be held to a minimum, enabling the temperature to be equalized.

Also, each of the downcomers 35a and 35b mentioned in the above embodiments has a top end that protrudes above a tubular baffle 30. However, in cases where the polyolefin particles are impeded from flowing between the outside surfaces of these downcomers 35a and 35b and the inside surface of the cylinder 12A or 12B or the inside surfaces of the tubular baffles 30, the downcomers 35a and 35b may be constructed so as not to protrude above the inside surfaces of the respective tubular baffles 30. In such a case, a mechanism (e.g., an on-off valve) for regulating the amount of particles which drop from an upper reaction zone 25 to a lower reaction zone 25 may be suitably provided on each downcomer.

Also, in the above second embodiment, the use of upper downcomers 35a as a means for transferring polyolefin particles from an upstream side reaction zone to a downstream-side reaction zone is described. However, the polyolefin particles may be transferred by an ejector system instead.

Furthermore, in the above second embodiment, polymerization is described as being carried out using two types of olefin-containing gases A and B. However, it is possible instead for one type of olefin-containing gas to be used alone, or for three or more types of olefin-containing gases to be used.

Here, in cases where, as in the third space 26III and the fourth space 26IV from the top of the cylinder 12B in the above-described second embodiment, the olefin-containing gas used in an upper reaction zone 26*b* and the olefin-containing gas used in a lower reaction zone 26*b* are of different types, before introducing the polyolefin particles that have been removed from the upper reaction zone 26*b* to the lower reaction zone 26*b*, it is preferable to solid-gas contact the polyolefin particles with a gas of the same type as the gas fed into the lower reaction zone 26*b*.

Figure 3:
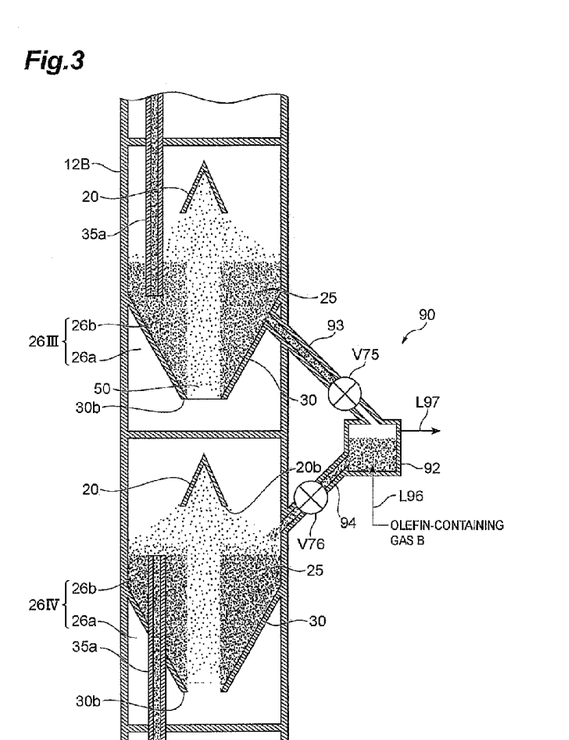
FIG. 3 is an enlarged schematic cross-sectional view of the olefin polymerization reactor 10B in FIG. 2.
Figure 4:
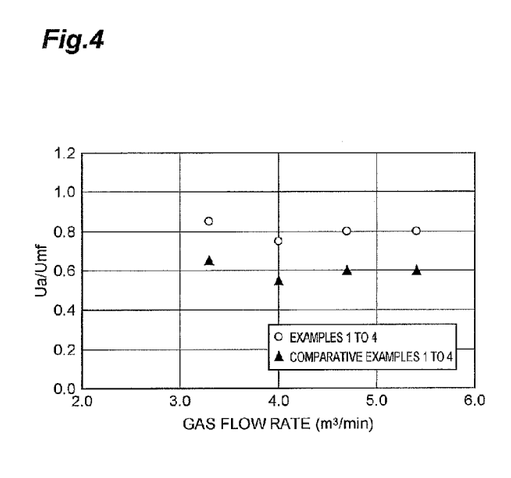
FIG. 4 is a graph showing the results obtained in examples of the invention and comparative examples.

FIG. 3 shows an example of solid-gas contacting means 90 for contacting polyolefin particles with a gas of the same type as the gas fed to the bottom reaction zone 26*b*. Features such as the gas feeding nozzles 60 and the gas discharge nozzles 70 are omitted in FIG. 3.

The solid-gas contacting means 90 shown in FIG. 3 includes a solid-gas contacting tank 92, a particle removing line 93, a particle introducing line 94, a gas introducing line L96 and a gas discharging line L97. The particles on the tubular baffle 30 in the third space 26III from the top are transferred to the solid-gas contacting tank 92 through the particle removing line 93 on which an on-off valve V75 is disposed and, within this solid-gas contacting tank 92, are contacted with an olefin-containing gas B fed in through the gas introducing line L96. The particles from which the olefin-containing gas A has been thoroughly removed are introduced to the reaction zone 26*b* of the fourth space 26IV from the top through the particle introducing line 94 on which an on-off valve V76 is disposed. Meanwhile, the gas following solid-gas contact is discharged via the gas discharging line L97.

By providing such a solid-gas contacting means 90, the entrainment and entry into the lower reaction zone 26*b* of the gas used in the upper reaction zone 26*b* by the polyolefin particles can be suppressed, making it easier to obtain polyolefin particles having the desired performance.

In the above second embodiment, an olefin polymerization reactor in which five spouted beds 8 are formed in the vertical direction was described. However, the number of spouted beds is not limited to five. From the standpoint of achieving a sufficient plug flow effect, the number of spouted beds is preferably at least three, and more preferably at least six. Moreover, the plurality of spouted beds need not necessarily be formed in the vertical direction. For example, a plurality of reactors within each of which a single spouted bed is formed at the interior may be arranged in a horizontal direction and coupled in series. Also, in reactor design and the operation control method, it is preferable to design the volume of each reactor stage and control the polyolefin particle hold-up or residence time in such a way as to narrow the residence time distribution of the polyolefin particles and to make the amount of polyolefin produced at each stage (including the olefin prepolymerization reactor 5) more uniform.

In addition, in the above embodiments, the use of the spouted bed device of the present invention as an olefin polymerization reactor is described. However, the inventive spouted bed device is not limited to this application, and may be employed in any granular material treatment for which the use of a spouted bed is appropriate. For example, the spouted bed device of the invention may be employed in other chemical reactions or in processes such as the drying, granulation or sintering of powders.

EXAMPLES

Examples 1 to 4 and Comparative Examples 1 to 4 were carried out so as to evaluate the solid-gas contacting efficiency between particles and gases in the annular particle bed portion of the spouted bed that is formed within the treatment zone. Evaluation of the solid-gas contacting efficiency between particles and gases was carried out by comparing the ratio Ua/Umf obtained by dividing the gas flow rate within the annular particle bed (Ua) by the minimum fluidization velocity of the particles (Umf).

Example 1

A cylindrical cold model reactor made of transparent vinyl chloride resin and capable of forming a single spouted bed in the cylinder (height, 1,100 mm) was furnished. This reactor had, disposed within the cylinder, a single tubular baffle of inverted conical shape with a gas inlet orifice therein and, paired with the baffle, a single deflector of conical shape. The cylinder was closed at the top end with a closing plate, and a plurality of gas introducing nozzles were formed at the top, enabling gases to be discharged laterally from these gas discharge nozzles. More specifically, the cylinder had four gas discharge nozzles, each with an inside diameter of 100 mm, located at positions 100 mm below the top of the cylinder. These gas discharge nozzles were disposed at substantially equal intervals in the circumferential direction of the cylinder.

The cylindrical cold model unit had an inside diameter $d_B$ of 500 mm, and the gas inlet orifice at the bottom end of the tubular baffle had a diameter $d_A$ of 100 mm. Accordingly, in the present example, the ratio $d_A/d_B$ between the gas inlet orifice diameter $d_A$ and the cylinder inside diameter $d_B$ was 0.2. The angle of inclination between the inside surface of the tubular baffle of inverted conical shape and the horizontal and the angle of inclination between the outside surface of the deflector and the horizontal were each 65°. The conical deflector had an inside diameter at the bottom end of 300 mm, and was hollow at the interior.

The interior of the reactor was filled with 25 kg of polypropylene particles having an average particle size of 900 μm. A gas was fed in from the gas inlet orifice, and the flow state of the polypropylene particles was observed. The minimum fluidization velocity (Umf) of the polypropylene particles was 0.20 m/s The gas introduced into the unit was room-temperature air, which was fed in at a rate of 3.3 m³ per minute.

In this example, the flow state of an ordinary spouted bed in which a spout of particles flowing upward together with a gas is stably formed and, at the periphery of the spout, particles fall downward, forming an annular particle bed, was observed. In this state, the pressure within the cylinder (near the inside wall) at a position 50 mm above the top end of the tubular baffle (where the tubular baffle is joined to the cylinder) and the height of the particle bed that has been formed above this position were measured, based on which the pressure loss in the annular particle bed was calculated. When calculating the pressure loss, the formed annular particle bed was treated as a particle packing layer and Ergun's formula was used to estimate the pressure loss of the particle packing layer. The gas superficial velocity corresponding to the measured pressure loss was calculated, and this gas superficial velocity was treated as the gas flow velocity (Ua) in the annular particle bed.

As a result, in this example, the gas flow velocity in the annular particle bed of the spouted bed was calculated to be 0.17 m/s, which was 0.85 as high as the minimum fluidization velocity.

Example 2

Aside from setting the flow rate of the gas introduced into the unit to 4.0 m³/min instead of 3.3 m³/min, the same procedure was carried out as in Example 1 and the gas flow velocity in the annular particle bed of the spouted bed was calculated. As a result, the gas flow velocity in the annular particle bed of the spouted bed was 0.15 m/s, which was 0.75 as high as the minimum fluidization velocity.

Example 3

Aside from setting the flow rate of the gas introduced into the unit to 4.7 m³/min instead of 3.3 m³/min, the same procedure was carried out as in Example 1 and the gas flow velocity in the annular particle bed of the spouted bed was calculated. As a result, the gas flow velocity in the annular particle bed of the spouted bed was 0.16 m/s, which was 0.80 as high as the minimum fluidization velocity.

Example 4

Aside from setting the flow rate of the gas introduced into the unit to 5.4 m³/min instead of 3.3 m³/min, the same procedure was carried out as in Example 1 and the gas flow velocity in the annular particle bed of the spouted bed was calculated. As a result, the gas flow velocity in the annular particle bed of the spouted bed was 0.16 m/s, which was 0.80 as high as the minimum fluidization velocity.

Comparative Example 1

Instead of discharging gases laterally from four gas discharge nozzles formed in the cylinder, all the gas discharge nozzles were blocked, in addition to which a closing plate was not used and the top of the cylinder was opened up so as to discharge gas upward. Aside from these changes, the same procedure was carried out as in Example 1 and the gas flow velocity in the annular particle bed of the spouted bed was calculated. As a result, the gas flow velocity in the annular particle bed of the spouted bed was 0.13 m/s, which was lower than the value obtained in Example 1 and 0.65 as high as the minimum fluidization velocity.

Comparative Example 2

Instead of discharging gases laterally from four gas discharge nozzles formed in the cylinder, all the gas discharge nozzles were blocked, in addition to which a closing plate was not used and the top of the cylinder was opened up so as to discharge gas upward. Aside from these changes, the same procedure was carried out as in Example 2 and the gas flow velocity in the annular particle bed of the spouted bed was calculated. As a result, the gas flow velocity in the annular particle bed of the spouted bed was 0.11 nm/s, which was lower than the value obtained in Example 2 and 0.55 as high as the minimum fluidization velocity.

Comparative Example 3

Instead of discharging gases laterally from four gas discharge nozzles formed in the cylinder, all the gas discharge nozzles were blocked, in addition to which a closing plate was not used and the top of the cylinder was opened up so as to discharge gas upward. Aside from these changes, the same procedure was carried out as in Example 3 and the gas flow velocity in the annular particle bed of the spouted bed was calculated. As a result, the gas flow velocity in the annular particle bed of the spouted bed was 0.12 m/s, which was lower than the value obtained in Example 3 and 0.60 as high as the minimum fluidization velocity.

Comparative Example 4

Instead of discharging gases laterally from four gas discharge nozzles formed in the cylinder, all the gas discharge nozzles were blocked, in addition to which a closing plate was not used and the top of the cylinder was opened up so as to discharge gas upward. Aside from these changes, the same procedure was carried out as in Example 4 and the gas flow velocity in the annular particle bed of the spouted bed was calculated. As a result, the gas flow velocity in the annular particle bed of the spouted bed was 0.12 m/s, which was lower than the value obtained in Example 4 and 0.60 as high as the minimum fluidization velocity.

The results from Examples 1 to 4 and Comparative Examples 1 to 4 are shown in FIG. 3. The values on the horizontal axis of the graph in FIG. 3 indicate the flow rate (m³/min) of the gas introduced from the gas inlet orifice. The values on the vertical axis indicate the quotient Ua/Umf of the gas flow velocity (Ua) within the annular particle bed divided by the minimum fluidization velocity (Umf) of the particles.

What is claimed is:

1. A spouted bed device comprising:
   a cylinder which extends vertically;
   a closing plate which closes a top end of the cylinder;
   a decreasing diameter member which is formed at a bottom end of the cylinder, has an inside diameter that decreases progressively downward, and has a gas inlet orifice at a bottom end thereof; and
   a gas discharge nozzle which passes through the cylinder from an inside surface to an outside surface thereof and which discharges gas from a treatment zone enclosed by a top surface of the decreasing diameter member, a bottom surface of the closing plate and the inside surface of the cylinder,
   wherein the gas discharge nozzle is provided above a spouted bed that is formed within the treatment zone.

2. The spouted bed device of claim 1, further comprising a deflector which is disposed above the gas inlet orifice in the treatment zone, has an outside diameter that increases progressively downward, is closed at a top end thereof, and has a bottom end that is spaced apart from an inside wall of the cylinder,
   wherein the gas discharge nozzle is provided above the bottom end of the deflector.

3. A multistage-type spouted bed device comprising:
   a cylinder which extends vertically;
   a plurality of closing plates which partition an interior of the cylinder into a plurality of spaces;
   a decreasing diameter member which is formed within each space, has an inside diameter that decreases progressively downward, and has a gas inlet orifice at a bottom end thereof;
   a gas feeding nozzle which passes through the cylinder from an outside surface to an inside surface thereof and which feeds a gas to, in each space, a bottom zone located between the decreasing diameter member and the closing plate therebelow; and
   a gas discharge nozzle which passes through the cylinder from the inside surface to the outside surface and which discharges a gas from, in each space, a treatment zone located between the decreasing diameter member and the closing plate thereabove, wherein the gas discharge nozzle is provided above a spouted bed that is formed within each treatment zone.

4. The multistage-type spouted bed device of claim 3, further comprising a plurality of deflectors which are disposed above the gas inlet orifice in each treatment zone, have an outside diameter that increases progressively downward, are closed at a top end thereof, and have a bottom end that is spaced apart from an inside wall of the cylinder, wherein the gas discharge nozzle is provided above the bottom end of each deflector and below the closing plate directly thereabove.

5. The multistage-type spouted bed device of claim 3, further comprising means for transferring particles from an upper treatment zone to a lower treatment zone.

6. A polyolefin production process which comprises carrying out olefin polymerization by using the spouted bed device of claim 1 to form a spouted bed of polyolefin particles within the treatment zone.

7. A polyolefin production process which comprises carrying out olefin polymerization by using the multistage-type spouted bed device of claim 3 to form a spouted bed of polyolefin particles in each treatment zone, wherein olefin polymerization is carried out by feeding to at least one treatment zone a second type of gas that differs from a first type of gas fed to the other treatment zones.

8. The polyolefin production process of claim 7, further comprising the step of:

solid-gas contacting polyolefin particles removed from a treatment zone to which the first type of gas is fed with a gas similar to the second type of gas that is different from the first type of gas, before introducing the polyolefin particles to a treatment zone where the second type of gas is fed.

* * * * *